United States Patent
Radhakrishnan

(10) Patent No.: US 9,338,106 B2
(45) Date of Patent: May 10, 2016

(54) INTEGRATING AND SEARCHING ELECTRONIC COMMUNICATIONS RECEIVED FROM A PLURALITY OF DIFFERENT COMMUNICATION PLATFORMS

(71) Applicant: International Business Machines Corporation, Armonk, NY (US)

(72) Inventor: Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 14/150,069

(22) Filed: Jan. 8, 2014

(65) Prior Publication Data
US 2015/0193457 A1    Jul. 9, 2015

(51) Int. Cl.
*G06F 17/00* (2006.01)
*H04L 12/58* (2006.01)
*H04L 12/24* (2006.01)

(52) U.S. Cl.
CPC ............. *H04L 51/04* (2013.01); *H04L 51/36* (2013.01); *H04L 41/18* (2013.01); *H04L 41/22* (2013.01); *H04L 51/32* (2013.01)

(58) Field of Classification Search
CPC .......... G06F 17/30867; G06F 12/0676; G06F 12/0684; G06F 13/374; G06F 17/3089
See application file for complete search history.

(56) References Cited

U.S. PATENT DOCUMENTS

| | | | |
|---|---|---|---|
| 7,890,957 B2 | 2/2011 | Campbell | |
| 8,407,620 B2 | 3/2013 | Cadiz et al. | |
| 2002/0124057 A1 | 9/2002 | Besprosvan | |
| 2008/0261569 A1 | 10/2008 | Britt et al. | |
| 2009/0187831 A1 | 7/2009 | Tiwana et al. | |
| 2011/0047221 A1 | 2/2011 | Watanabe et al. | |
| 2011/0087534 A1* | 4/2011 | Strebinger | G06Q 10/06 705/14.25 |
| 2011/0130168 A1 | 6/2011 | Vendrow et al. | |

* cited by examiner

*Primary Examiner* — Truong Vo
(74) *Attorney, Agent, or Firm* — Maeve M. Carpenter; Madeline F. Schiesser; Keohane & D'Alessandro PLLC

(57) ABSTRACT

Embodiments described herein provide approaches for integrating and searching electronic communications received from a plurality of different communication platforms. Specifically, a consolidated communication/messaging platform integrates and consolidates bi-directional communications/messages from individuals, groups, or other entities from various channels (e.g., text messaging, instant messaging, social networking platforms, e-mail, and the like), and enables end users to search and locate content or substance of a specific communication via a user interface and locally stored repository.

20 Claims, 3 Drawing Sheets

INTEGRATING AND SEARCHING ELECTRONIC COMMUNICATIONS RECEIVED FROM A PLURALITY OF DIFFERENT COMMUNICATION PLATFORMS

BACKGROUND

1. Field of the Invention

This invention relates generally to electronic communication management and, more specifically, to integrating and searching electronic communications received from multiple communication platforms.

2. Description of the Related Art

Over the past several decades, numerous communications technologies have become commonplace. This includes the Internet, which provides personalized web sites, weblogs, and the like, to electronic mail, which has migrated from conventional Internet clients such as personal computers, over to cellular phones, personal digital assistants, and dedicated wireless electronic mail clients. Other technologies such as facsimiles, voice mail, Short Messaging Service ("SMS") and the like are also commonplace. In general, each new medium provides a separate communication channel with its own underlying technology.

Two persons connected socially and/or professionally may communicate with each other via different mechanisms such as text messages via smart phone, instant messages, email and in-mail, i.e., messaging embedded within social and professional network platforms. Since this communication happens via multiple channels, it makes it difficult for an end user or some other entity to look back at two-party or three-party communications historically for search, analytics, etc.

SUMMARY

In general, embodiments described herein provide approaches for integrating and searching electronic communications received from a plurality of different communication platforms. Specifically, a consolidated communication and messaging platform integrates and consolidates communications/messages from individuals, groups, or other entities from various channels (e.g., text messaging, instant messaging, social networking platforms, e-mail, and the like), and enables end users to search and locate content or substance of a specific communication via a user interface and locally stored repository.

One aspect of the present invention includes a method comprising computer-implemented steps of: receiving electronic communications from each of a plurality of different communication platforms; compiling the electronic communications according to an identity of a sender; storing the electronic communications on a client system of an end user; and enabling a search of the electronic communications based on at least one of the identity of the sender and a keyword.

Another aspect of the present invention provides a computer system for integrating and searching electronic communications received from a plurality of different communication platforms, the computer system comprising: a memory medium comprising program instructions; a bus coupled to the memory medium; and a processor, for executing the program instructions, coupled to an integration platform via the bus that when executing the program instructions causes the system to: receive electronic communications from each of the plurality of different communication platforms; compile the electronic communications according to an identity of a sender; store the electronic communications on a client system of the end user; and enable a search of the electronic communications based on at least one of the identity of the sender and a keyword.

Another aspect of the present invention provides a method for integrating and searching electronic communications received from a plurality of different communication platforms, the method comprising: receiving, using at least one computing device, an electronic communication from each of the plurality of different communication platforms; compiling, using the at least one computing device, the electronic communications according to an identity of a sender; storing, using the at least one computing device, the electronic communications on a client system of the end user; and enabling, using the at least one computing device, a search of the electronic communications based on at least one of the identity of the sender and a keyword.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
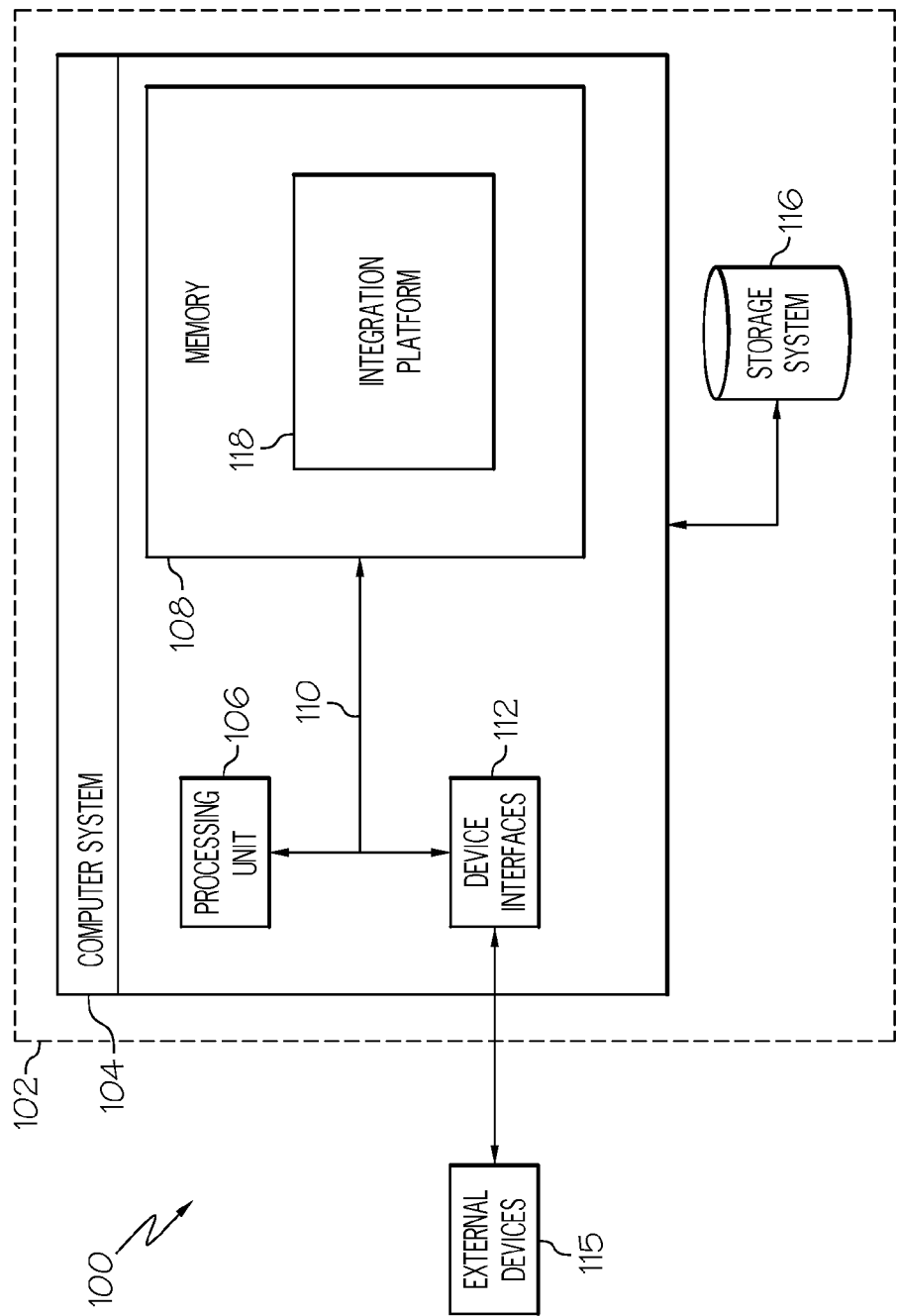
FIG. 1 shows a pictorial representation of an implementation of the invention according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining,"

"evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for integrating and searching electronic communications received from multiple, different communication platforms. Specifically, a consolidated communication/messaging platform integrates and consolidates bi-directional communications/messages from individuals, groups, or other entities from various channels (e.g., text messaging, instant messaging, social networking platforms and e-mail), and enables end users to search and locate content or substance of a specific communication via a user interface and locally stored repository.

Referring now to FIG. 1, a computerized implementation 100 of an exemplary embodiment will be shown and described. As depicted, implementation 100 includes computer system 104 deployed within a computer infrastructure 102 (e.g., a client device). This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for integrating and searching a plurality of electronic communications received from multiple communication platforms. It should be understood that any other computers implemented under the present invention may have different components/software, but will perform similar functions. As shown, computer system 104 includes a processing unit 106 capable of communicating with an integration platform 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115 and integration platform 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating integration platform 118, which is stored in memory 108 and/or storage system 116. While executing computer program code, processing unit 106 can read and/or write data to/from memory 108, storage system 116, and integration platform 118. Storage system 116 can include VCRs, DVRs, RAID arrays, USB hard drives, optical disk recorders, flash storage devices, and/or any other data processing and storage elements for storing and/or processing data.

Figure 2:
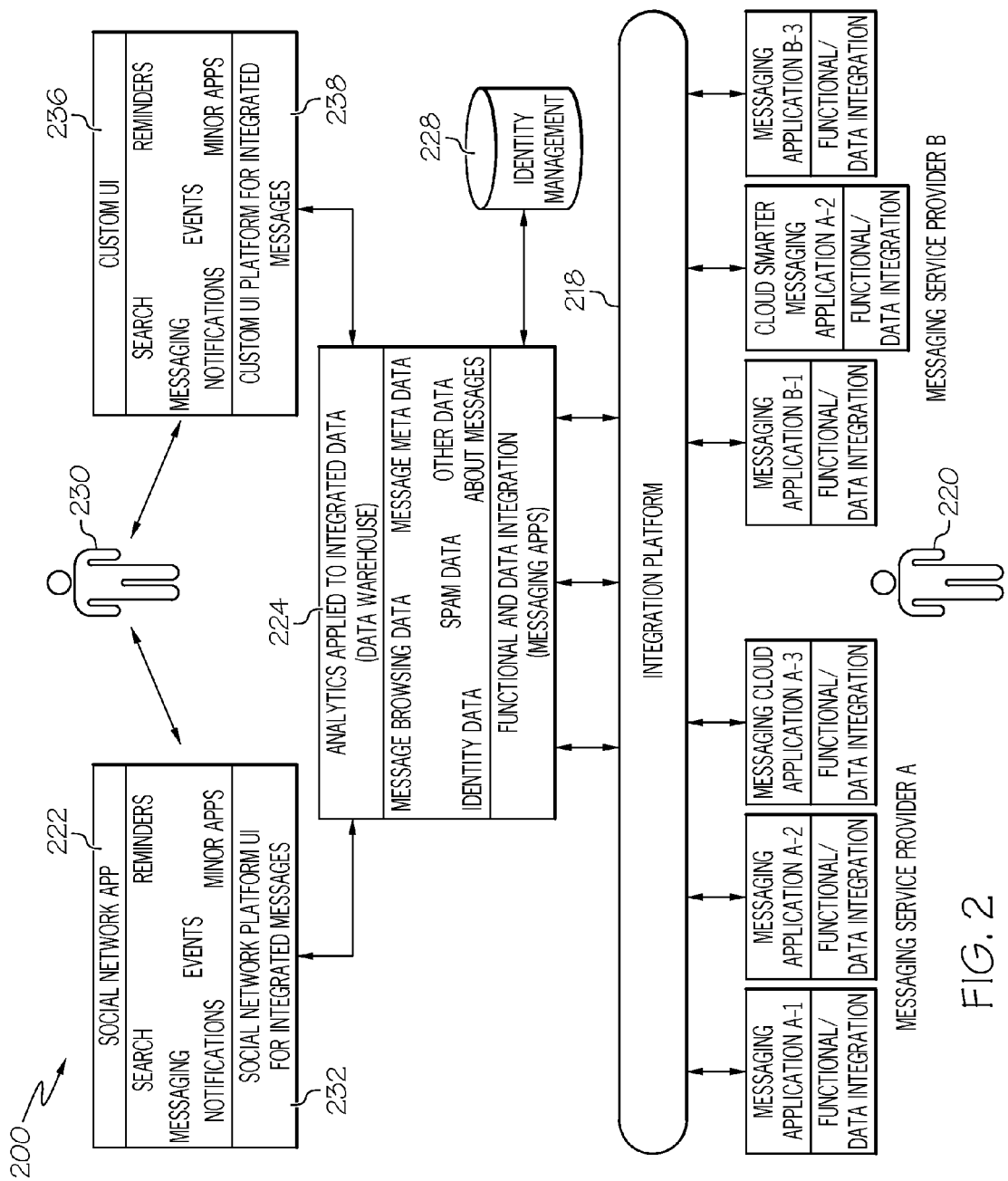
FIG. 2 shows an architecture in which communication integration and searching is implemented according to illustrative embodiments.

Referring now to FIG. 2, the structure and operation of a system 200 for integrating and enabling searching of electronic communications received from multiple communication platforms according to exemplary embodiments will be described in greater detail. As illustrated, system 200 is configured to receive a plurality of communications (e.g., one-to-one, bi-directional messages) from a sender 220 via multiple communication platforms, e.g., communication modalities such as e-mail applications, SMS applications, social network applications, instant-messaging applications, peer-to-peer applications, etc., which include all necessary components and functionality for receiving input(s) from sender 220. In FIG. 2, the communication platforms are represented by social network application 222 and messaging applications A-1, A-2, A-3, B-1, B-2, and B-3. These applications generate and transmit text messages, instant messages, e-mails, social networking messages and/or e-mails, and the like. It will be appreciated that any number of messaging service providers (e.g., Messaging Service Providers A and B) may provide/manage the various messaging applications. Furthermore, the messaging applications may include one or more cloud computing applications (e.g., Messaging Cloud Applications A-3 and B-2). As is known, cloud-based applications operate in a networked/cloud-computing environment and may provide computation resources enhanced by one or more additional abstraction layers (e.g., a cloud layer), thus making disparate devices appear to an end-consumer as a single pool of seamless resources.

System 200 further comprises an analytics engine 224, which operates with, or is a subcomponent of, integration platform 218. Analytics engine 224 is configured to receive data (e.g., message browsing data, identity data, spam data, message metadata) corresponding to each of the electronic communications, and compile the electronic communications, e.g., based on an identity of sender 220 as determined with data from an identity management device 228. In one embodiment, analytics engine 224 receives input signals from the various messaging applications, wherein the input signals may be converted into commands. The input signals may encode data in any format suitable for interpretation by analytics engine 224 including text, audio (such as voice audio, dual-tone multi-frequency audio, and so forth), a barcode scan, an image, a video, a selection, a data feed item, a sensor measurement, a clock tick, an alarm, a client context description, sender and receiving information, user privilege information, textual information (e.g., e-mail or SMS message), tabular information (e.g., cell phone UI table or web form), non-textual input, and/or the like. The commands may be computer-interpretable commands, e.g., in a command language definition (CLD) format or other command language format. The input signals may already be in a command format where, for example, a client device can generate corresponding output. Each input signal may include or be associated with a well-formed instruction, a malformed instruction, a longhand instruction, a shorthand instruction, an alternate instruction, or the like. In one embodiment, each input is encoded/decoded into a binary representation to a format suitable for presentation to an end user 230 via a user interface.

Analytics engine 224 further provides the necessary functional components for handling data integration from each of the plurality of messaging applications, e.g., by conversion of data from a first format suitable for use with the first messaging application to a second format suitable for use with the second message application, or by conversion of data from the first format to a format common to multiple messaging applications. Furthermore, analytics engine 224 may comprise a parser (not specifically shown) for conducting syntax analysis and semantic parsing on expressions within the electronic communications. The expression may be a logical expression, a textual expression, a binary expression, a hexadecimal expression, an octal expression, or any and all other kinds and/or encodings of expression. The syntax analysis may utilize context-free grammar and may attempt to match an expression to the grammar, wherein an input signal may include the expression. The context-free grammar may be relaxed so as to accept some invalid grammatical constructs. The semantic parsing may be directed at working out an intent or implication of an expression that has been accepted by the syntax analysis.

As further shown, system 200 includes identity management device 228, which can compile a collection of user and/or business information in a searchable directory. The information for identity management device 228 may come from electronic presences, email, text messages, hard copy, or the like. Identity management device 228 may be a private directory, a public directory, or any other type of directory. The collection of users may be from a group (e.g. professional), association, society, or the like. The directory may include personal information, association to a business, association to another member of the association, association membership information (e.g. office held), or the like. The directory information for each user may include keywords, tags, or the like that may permit aggregation of user information.

Identity management device 228 may have an aggregation capability. The aggregation may be performed on any of the fields within the directory such as name, location, business, association, electronic communication type, communication dates, platform types, and the like. The aggregation of information may return related users and businesses as part of the aggregation. The aggregation may also be performed using the tags that may be associated with a particular user.

As shown in FIG. 2, analytics engine 224 may communicate with social network application 222 (e.g., Twitter®, Facebook®, LinkedIn®, etc.), which contains a social network platform user interface 232 for displaying integrated messages to end user 230. (Twitter is a registered trademark of Twitter, Inc. having an address at 1355 Market Street, Suite 900 San Francisco, Calif. 94103, Facebook is a registered trademark of Facebook, Inc. having an address at 1601 Willow Road Menlo Park, Calif. 94025, and LinkedIn is a registered trademark of LinkedIn Corporation having an address at Stierlin Court Mountain View, Calif. 94043.) In this embodiment, the integrated messages are compiled, converted (if necessary), and displayed within the existing user interface 232 of social network application 222. That is, all messages from each system/platform are integrated into a user-selected communication platform (e.g., Facebook®) from the plurality of different communication platforms available or previously used. In another embodiment, end user 230 may view and search communications via a custom user interface 236, e.g., in an application that is specifically designed for displaying communications of different formats that originate from different messaging platforms. In this embodiment, analytics engine 224 can communicate with custom user interface 236, which can contain a custom user interface platform 238 for integrating and enabling a search of the electronic communications.

During operation, analytics engine 224 and integration platform 218 store each of the electronic communications on a client system for end user 230 in a local repository, e.g., storage system 116 shown in FIG. 1, to enable a later search of the plurality of communications. Each communication is stored together with message browsing data, identity data, spam data, message metadata, etc., which enables a query by end user 230 via the user interface, e.g., based on a keyword, the identity of sender 220, and a date/time range. The query may be a database query, such as and without limitation, a structured query language (SQL) query, which may be communicated according to open database connectivity (ODBC).

Consider the non-limiting example in which sender 220 and end user 230 are both professionally and socially connected and communicate via different channels, e.g., Facebook email/chat, LinkedIn in-mail, and e-mail, as well as text periodically via their smart phones. End user 230 gets a text message about a communication that sender 220 transmitted a few months back regarding a conference presentation. End user 230, however, is unsure which communication platform was used for this particular communication. With system 200, end user 230 may log-in to a user selected interface (e.g., UI 236) to view all electronic exchanges (e.g., email, text, chat, etc.) with sender 220 for a given period of time, and/or for the given subject matter (i.e., the conference presentation). End user 230 is able to efficiently locate the original message from sender 220 and respond accordingly.

In another embodiment, the method that performs communication integration and searching can be provided on a subscription, advertising, and/or fee basis. That is, a service provider could offer to provide the storage of the electronic communications on the client system and the searching of the plurality of communications. In this case, each communication platform associated with each user is first registered with the service provider, which can then create, maintain, support, etc., a computer infrastructure, such as system 200 (FIG. 2) that performs the processes of the invention for one or more consumers. In return, the service provider can receive payment from the consumer(s) under a subscription and/or fee agreement. According to this embodiment, the following non-limiting steps may be carried out:

1. End user 230 registers for this service with the provider and provides, or allows recognition of, all email, text, and/or social networking messaging platforms used;
2. end user 230 subscribes to this service by paying a monthly subscription fee;
3. end user 230 receives a customized user interface/log-in page, which can be modified as desired by end user 230;
4. when desired, end user 230 is able to log-in and see streams of messages that are coming to the different messaging platforms that he/she uses; and
5. end user 230 is able to search by keyword, name, date, etc., to find all desired messages.

It can be appreciated that the approaches disclosed herein can be used within a computer system to integrate and allow searching of a plurality of electronic communications received from multiple communication platforms. In this case, as shown in FIGS. 1-2, the integration platform can be provided, and one or more systems for performing the processes described in the invention can be obtained and deployed to computer infrastructure 102 (FIG. 1). To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 3:
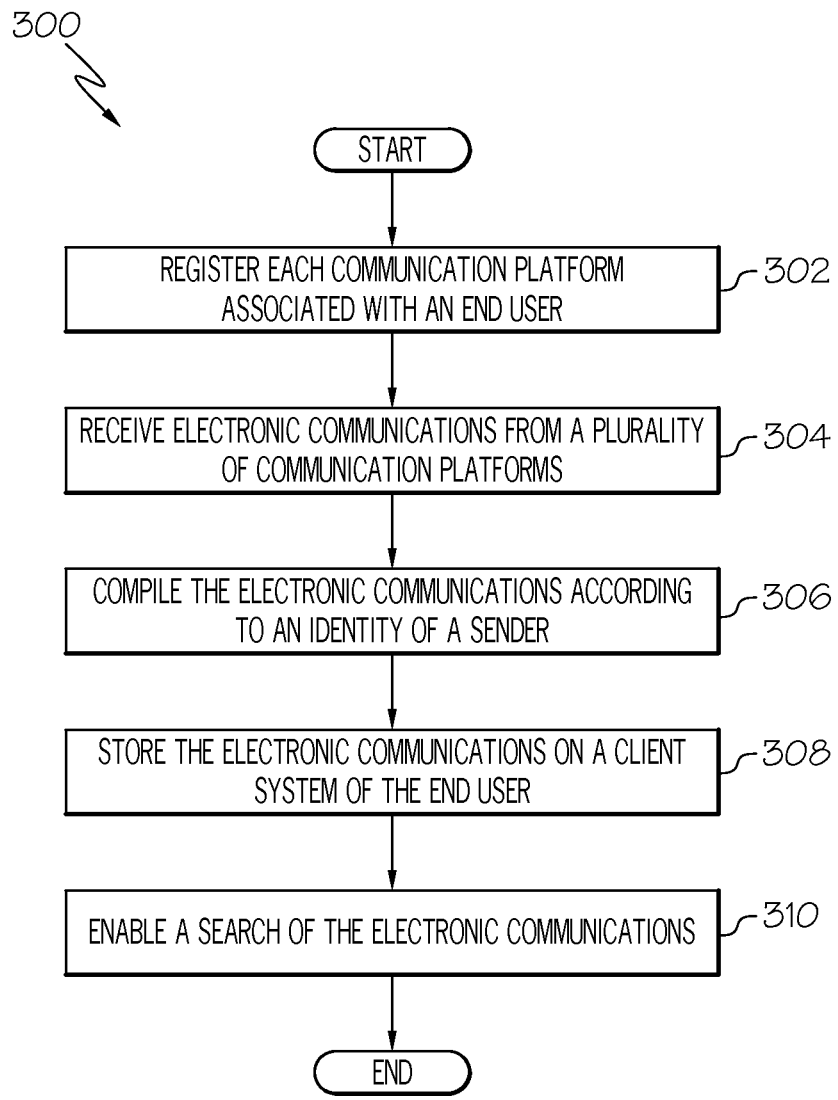
FIG. 3 shows a process flow for integrating and searching a plurality of electronic communications received from multiple communication platforms.

As depicted in FIG. 3, a system (e.g., computer system 104) carries out the methodologies disclosed herein. Shown is a process flow 300 for integrating and searching electronic communications received from a plurality of different communication platforms. At 302, each communication platform associated with an end user is registered. At 304, electronic communications from a plurality of different communication platforms are received. At 306, the electronic communications are compiled according to an identity of a sender. At 308, the electronic communications are stored on a client system. At 310, a search of the electronic communications based on a keyword or the identity of the sender is enabled.

Process flow 300 of FIG. 3 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, as will be described herein, systems/units may also be implemented as a combination of software and one or more hardware devices. For instance, integration platform 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

For example, an implementation of exemplary computer system 104 (FIG. 1) may be stored on or transmitted across some form of computer-readable storage medium and/or computer-readable storage device. Computer-readable storage medium/device can be media that can be accessed by a computer. "Computer-readable storage medium/device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication medium" typically embodies computer readable instructions, data structures, and program modules. Communication media also includes any information delivery media.

It is apparent that there has been provided approaches for integrating and searching electronic communications received from a plurality of different communication platforms. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method comprising computer-implemented steps of:
    receiving electronic communications from each of a plurality of different communication platforms;
    converting the electronic communications from each of the plurality of different communication platforms from a first format used with the plurality of different communication platforms to a second format for use with a selected communication platform;
    compiling the electronic communications according to an identity of a sender;
    storing the electronic communications on a client system of an end user, the client system having access to a directory of information about a set of senders, the information comprising at least one of: a sender association to an organization, a sender association to another member of an organization, and an organization membership position of a sender;
    presenting the converted electronic communications to the end user in a listing in an application of the selected communication platform; and
    enabling a search of the electronic communications and the directory based on at least one of the identity of the sender and a keyword.

2. The method of claim 1, wherein the compiling the electronic communications comprises integrating a plurality of messages into a selected communication platform from the plurality of different communication platforms.

3. The method of claim 1, wherein the enabling the search of the electronic communications comprises:
    providing a user interface to the end user;
    querying the electronic communications stored on the client system via the user interface; and
    returning a set of messages, a set of related senders, and a set of related organizations.

4. The method of claim 3, further comprising receiving the identity of the sender and a date range into the user interface.

5. The method of claim 3, further comprising providing, on a subscription basis, each of: a storage of the electronic communications on the client system, and the querying of the electronic communications.

6. The method of claim 1, further comprising registering each of the plurality of different communication platforms associated with the end user and permitting recognition of all electronic communications on each registered communication platform.

7. The method of claim 1, wherein the storing the electronic communications comprises storing data and metadata of each of the electronic communications.

8. A computer system for integrating and searching electronic communications received from a plurality of different communication platforms, the computer system comprising:
    a memory medium comprising program instructions;
    a bus coupled to the memory medium; and
    a processor, for executing the program instructions, coupled to an integration platform via the bus that when executing the program instructions causes the system to:
        receive an electronic communication from each of the plurality of different communication platforms;
        convert the electronic communications from each of the plurality of different communication platforms from a first format used with the plurality of different communication platforms to a second format for use with a selected communication platform;
        compile the electronic communications according to an identity of a sender;
        store the electronic communications on a client system of an end user, the client system having access to a directory of information about a set of senders, the information comprising at least one of: a sender association to an organization, a sender association to another member of an organization, and an organization membership position of a sender;
        present the converted electronic communications to the end user in a listing in an application of the selected communication platform; and
        enable a search of the electronic communications and the directory based on at least one of the identity of the sender and a keyword.

9. The computer system of claim 8, wherein the program instructions causing the system to compile the electronic communications further comprise program instructions to integrate a plurality of messages into a selected communication platform from the plurality of different communication platforms.

10. The computer system of claim 8, wherein the program instructions causing the system to enable the search of the electronic communications further comprise instructions to:
    provide a user interface to the end user;
    query the electronic communications stored on the client system via the user interface; and
    return a set of messages, a set of related senders, and a set of related organizations.

11. The computer system of claim 10, wherein the program instructions further comprise program instructions to receive the identity of the sender and a date range into the user interface.

12. The computer system of claim 10, wherein the program instructions further comprise program instructions to provide, on a subscription basis, each of: a storage of the electronic communications on the client system, and the query of the electronic communications.

13. The computer system of claim 8, wherein the program instructions further comprise program instructions to register each of the plurality of different communication platforms associated with the end user and to permit recognition of all electronic communications on each registered communication platform.

14. The computer system of claim 8, wherein the program instructions to store the electronic communications further comprise program instructions to store data and metadata of each of the electronic communications.

15. A method for integrating and searching electronic communications received from a plurality of different communication platforms, the method comprising:

receiving, using at least one computing device, an electronic communication from each of the plurality of different communication platforms;

converting, using the at least one computing device, the electronic communications from each of the plurality of different communication platforms from a first format used with the plurality of different communication platforms to a second format for use with a selected communication platform;

compiling, using the at least one computing device, the electronic communications according to an identity of a sender;

storing, using the at least one computing device, the electronic communications on a client system of an end user, the client system having access to a directory of information about a set of senders, the information comprising at least one of: a sender association to an organization, a sender association to another member of an organization, and an organization membership position of a sender;

presenting, using the at least one computing device, the converted electronic communications to the end user in a listing in an application of the selected communication platform; and enabling, using the at least one computing device, a search of the electronic communications and the directory based on at least one of the identity of the sender and a keyword.

16. The method of claim 15, wherein the compiling the electronic communications comprises integrating a plurality of messages into a selected communication platform from the plurality of different communication platforms.

17. The method of claim 15, wherein the enabling the search of the electronic communications comprises:

providing a user interface to the end user;

querying the electronic communications stored on the client system via the user interface; and returning a set of messages, a set of related senders, and a set of related organizations.

18. The method of claim 17, further comprising receiving, using the at least one computing device, the identity of the sender and a date range into the user interface.

19. The method of claim 17, further comprising providing, on a subscription basis, using the at least one computing device, each of: a storage of the electronic communications on the client system, and the querying of the electronic communications.

20. The method of claim 15, further comprising registering, using the at least one computing device, each of the plurality of communications platforms associated with the end user and permitting, using the at least one computing device, recognition of all electronic communications on each registered communication platform.

* * * * *